UNITED STATES PATENT OFFICE.

HIPPOLYTE DESSOLIERS, OF ALGIERS, ALGERIA.

SYSTEM OF PRODUCING HEAT-RAINS BY MEANS OF SHEETS OF WATER OF SLIGHT DEPTH.

1,252,670. Specification of Letters Patent. Patented Jan. 8, 1918.

No Drawing. Application filed June 20, 1914. Serial No. 846,410.

*To all whom it may concern:*

Be it known that HIPPOLYTE DESSOLIERS, engineer, a citizen of the French Republic, and residing at Algiers, Algeria, 8 Rue Monge, has invented certain new and useful Improvements in Systems of Producing Heat-Rains by Means of Sheets of Water of Slight Depth, of which the following is a specification.

The present invention relates to a method and means whereby it is possible to increase the normal rainfall of a particular area of country and is especially applicable to relatively arid regions. In many of such regions there are to be found lake-like bodies of water, the extent of which varies with the season, being of maximum size and depth during the winter and gradually diminishing during the other seasons.

By the method and means hereinafter referred to it is possible to insure more than the normal rainfall in a zone adjacent to such a body of water and to regulate and control the amount thereof to a considerable degree.

Briefly stated, the invention provides for abnormally increasing the evaporation from a predetermined area within and completely surrounded by a body of water, whereby the column of vapor arising from said central area, augmented by the humid air drawn from the entire surface of the surrounding body, will in a relatively short time produce first a cloudy mass and finally rain. To effect the result referred to the said central area is maintained of a substantially constant, relatively shallow, depth, and, if desired, means may be provided for assisting the action of vapor rising therefrom in drawing air from the surface of the relatively larger and deeper surrounding body.

A practical manner of carrying the invention into effect will now be described. During the "dry season" when the body of water which is to be utilized has attained its minimum depth, a suitable dam, preferably of circular outline, is erected therein, the height of such dam being about twice that of the maximum depth of water in the area it incloses and the dam is located at a considerable distance from the high water margin of the lake. The extent of the area inclosed by the dam will depend upon the size of the lake and on the amount of rainfall which it is desired to produce. The dam will thus extend considerably above the level of the highest possible water in the lake and it will be suitably sloped and reinforced to resist the erosive action of waves produced on stormy days. In the bottom of the dam are arranged pipes or small aqueducts with sluices for regulating the admission of water into the inclosure within the dam from the larger surrounding body. The pipes or conduits are suitably distributed around the dam in such number and in such relation to the bottom of the inclosed area that it is possible to provide a uniform shallow or thin sheet of water over said area. It will be understood that during the rainy season or periods of rain the admission of water to the area inclosed by the dam will be discontinued so that the body of water therein will be practically constantly maintained of the desired depth. As noted, the water within the inclosure is to be maintained very shallow in comparison with the surrounding body. For example, the water in the inclosed area may have a depth of only from two to four centimeters, while the body surrounding the dam may have a depth of 10, 20 or even a hundred centimeters.

Owing to the difference in depth of the bodies of water within and outside of the dam the evaporation from the inclosed area will be much more active than from the body surrounding the dam, because the rays of the sun will readily pass through the thin layer of water and strike the bottom of the lake so that the water within the dam or inclosure will be more quickly heated than in the other portions of the lake where owing to the greater depth of water the sun's rays do not freely penetrate to the bottom. Air contacting with the water within the inclosure will become relatively richer in vapor owing to the greater evaporation and at the same time its temperature will be increased. This heated air will ascend in a column like form whenever the sun is shining and attract to itself the humid air that floats on the surface of the water surrounding the dam. The ascending column will act to draw such humid air from all directions.

As such column of air ascends its temperature will be gradually lowered in proportion of about one degree centigrade for each 100 to 104 meters of elevation, and on reaching the point of saturation it produces a cloudy mass which gradually increases and forms a cloud which will later effect the transformation into rain of the fine particles of water that have been carried up. If there is but little wind the rain will fall comparatively close to the place of formation of the clouds, whereas if the air currents are of considerable strength the rain may occur at some distance from the lake. The distance from the lake at which rain will occur is also in a measure determined by the elements which control the height at which the vapors will be condensed.

To insure that the column of heated air rising from the inclosed area will be properly guided with relation to the surrounding body of water a circular platform may be erected in the middle of the inclosure, the surface of which should be approximately one-hundredth of that of the area inclosed by the dam. The height of this platform should be such that it will be above the water level even if the dam should break and the area inclosed thereby be flooded to an undesirable depth. On the platform is erected a conical sheet iron tower having a base diameter of from 20 to 40 meters and provided with spiral passages. For this purpose the construction of tower shown in my French Patent No. 415,426 dated April 21, 1910, may be employed. This tower serves the double purpose of heating the ascending vapor column and of imparting a rotary motion thereto which renders said column stable.

To assist in maintaining a uniform depth of water over the area within the dam, notwithstanding slight inequalities that may exist in the bottom thereof, and to enable the super-evaporation to be regulated as desired and the height at which the cloudy masses are formed to be modified, it is preferred to divide the area within the dam into zones, by means of concentric walls. For example, the area referred to may be divided into six concentric zones, the outer one being immediately adjacent the dam while the central one contains the platform and tower before referred to. Further, said concentric zones may be divided into smaller spaces by radially extending banks or walls and suitable sluices are arranged in the several walls and banks so that water from the lake may be admitted into any selected or desired number thereof, and in such amounts as are required.

The stability of the ascending column of vapor depends in the first instance on the quantity of such vapor. It is necessary therefore that the area of super-evaporation should have a relatively large surface. Secondly, such stability depends upon the relative degree of heating of the ascending column and the amount of vapor which it contains. From hot and only slightly moist air condensation will not occur except at a very great height and the slightest breeze would be sufficient to prevent the rain from falling except at very definite points. It is therefore desirable if it is proposed or desired to produce rain within a comparatively small radius from the lake that the ascending column should be considerably enriched with vapor and be relatively but slightly heated.

The admission of water to all of the zones within the dam will provide a maximum enrichment of vapor and a minimum amount of dry heated air. Under such conditions the point of saturation will be reached at a minimum level and the cloudy mass will form at such slight elevation that rain produced thereby will fall in the immediate vicinity of the lake. If, however, water is only admitted to five of the six zones, the cloudy mass will be formed at a higher elevation and rain will fall at a more distant point.

The rain producing action may be stopped by admitting so much water to the area within the dam that the depth thereof will correspond with that of the surrounding body of water or by closing the sluices completely so that no water is admitted to the inclosed area.

The conical tower referred to is also of assistance in imparting the desired stability to the rising column of air and vapor as the air passing slowly along the spiral passages inside thereof is heated to a greater extent than the air drawn upwardly outside of the conical tower so that the temperature of the rising column is greatest at its center and declines progressively therefrom toward the periphery. The spiral passages in the conical tower also act to impart a rotary motion to the ascending column of air and vapor which is of service in maintaining the stability of such column.

By the method and means described it is possible to effect the frequent production of rain from water obtained from a shallow lake-like body and the periods of rainfall may be controlled or entirely stopped as desired.

Having thus described the invention what is claimed is:—

1. The herein described method of producing rain, which comprises maintaining a thin sheet of water within the area of a lake-like body of materially greater depth, for the purpose set forth.

2. The herein described method of producing rain, which comprises inclosing an area within a lake-like body of water, and maintaining the water within the inclosed area relatively shallow and of materially less depth than the surrounding body, for the purpose set forth.

3. The herein described method of producing rain, which comprises dividing a lake-like body of water into a plurality of separated areas and maintaining the water in a central area as a thin film or relatively very shallow in comparison with the depth of water in the section or sections by which said control area is completely surrounded, for the purpose set forth.

4. The herein described method of producing rain, which comprises dividing a lake-like body of water into a plurality of separated concentrically arranged areas, providing in the central area means for assisting in collecting and directing the upward movement of vapors of evaporation rising therefrom, and maintaining the water in said central area at a depth materially less than that in the surrounding area or areas, for the purpose set forth.

5. A means for assisting in the production of rain comprising a dam or embankment erected in a lake-like body of water to inclose an area thereof and separate it from a larger area completely surrounding it, said embankment or dam rising above the highest water level of the lake, and means for controlling the admission of water to said inclosed area from the surrounding body whereby the water within the dam may be maintained in the form of a very thin or shallow body for the purpose described.

6. A means for assisting in the production of rain comprising a dam or embankment erected in a lake-like body of water to inclose and area thereof and separate it from a larger area completely surrounding it, said embankment or dam rising above the highest water level of the lake, means for controlling the admission of water to said inclosed area from the surrounding body, whereby the water within the dam may be maintained in the form of a thin shallow body of less depth than that surrounding the dam, and a conical structure erected within the area inclosed by the dam, substantially as described.

In testimony whereof I affix my signature in presence of two witnesses.

HIPPOLYTE DESSOLIERS.

Witnesses:
LOUIS HERNANDEZ,
C. MEDDONEZ.

Copies of this patent may be obtained for five cents each, by addressing the "Commissioner of Patents, Washington, D. C."